United States Patent
Cholst et al.

(10) Patent No.: US 11,122,735 B2
(45) Date of Patent: Sep. 21, 2021

(54) STRING TRIMMER HEAD AND SPOOL

(71) Applicant: MILWAUKEE ELECTRIC TOOL CORPORATION, Brookfield, WI (US)

(72) Inventors: Beth E. Cholst, Wauwatosa, WI (US); Troy C. Thorson, Cedarburg, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 16/129,504

(22) Filed: Sep. 12, 2018

(65) Prior Publication Data

US 2019/0075721 A1    Mar. 14, 2019

Related U.S. Application Data

(60) Provisional application No. 62/557,636, filed on Sep. 12, 2017.

(51) Int. Cl.
*A01D 34/416*      (2006.01)

(52) U.S. Cl.
CPC ..... *A01D 34/4166* (2013.01); *A01D 34/4163* (2013.01); *A01D 34/4165* (2013.01)

(58) Field of Classification Search
CPC ............ A01D 34/4166; A01D 34/4163; A01D 34/4165; A01D 34/412; A01D 34/416; A01D 34/4161; A01D 34/4162; A01D 34/4167
USPC .......................................................... 30/276
See application file for complete search history.

(56) References Cited

U.S. PATENT DOCUMENTS

| | | | |
|---|---|---|---|
| 4,054,922 A | 10/1977 | Ballas et al. | |
| 4,104,796 A | 8/1978 | Sheldon | |
| 4,161,820 A * | 7/1979 | Moore | A01D 34/4163 30/276 |
| 4,203,212 A | 5/1980 | Proulx | |
| 4,245,454 A | 1/1981 | Zien | |
| 4,259,782 A | 4/1981 | Proulx | |
| 4,301,642 A | 11/1981 | Thurber | |
| 4,347,666 A | 9/1982 | Moore | |
| 4,349,962 A * | 9/1982 | Itagaki | A01D 34/4163 30/276 |
| 4,419,822 A | 12/1983 | Harris | |
| 4,426,780 A | 1/1984 | Foster | |
| 4,566,189 A | 1/1986 | Muto | |
| 4,571,831 A * | 2/1986 | White, III | A01D 34/416 30/276 |
| 4,633,588 A | 1/1987 | Pittinger, Jr. | |
| 4,672,798 A | 6/1987 | Ota | |

(Continued)

FOREIGN PATENT DOCUMENTS

| | | |
|---|---|---|
| EP | 0215416 A1 | 3/1987 |
| EP | 0313679 B1 | 5/1996 |

(Continued)

*Primary Examiner* — Jonathan G Riley
(74) *Attorney, Agent, or Firm* — Michael Best & Friedrich LLP

(57) ABSTRACT

A spool and a trimmer head. The trimmer head includes a housing defining a cavity and rotatable about an axis. A spool is supported in the cavity and operable to support line to be dispensed. The spool is movable along the axis relative to the housing, and the spool and the housing define cooperating conical surfaces to center the spool during movement of the spool toward and in a position relative to the housing.

8 Claims, 8 Drawing Sheets

(56) References Cited

U.S. PATENT DOCUMENTS

| | | | |
|---|---|---|---|
| 4,823,465 A * | 4/1989 | Collins | A01D 34/4163 30/276 |
| 4,827,702 A | 5/1989 | Cerreta | |
| 4,888,871 A | 12/1989 | Engelbrecht | |
| 4,926,557 A | 5/1990 | Haupt | |
| 5,020,224 A | 6/1991 | Haupt | |
| 5,060,384 A | 10/1991 | Everts | |
| 5,109,607 A | 5/1992 | Everts | |
| 5,193,278 A | 3/1993 | Osakabe et al. | |
| 5,544,417 A | 8/1996 | Altos et al. | |
| 5,657,542 A * | 8/1997 | White, III | A01D 34/416 30/276 |
| 5,659,960 A | 8/1997 | Everts et al. | |
| 5,661,960 A | 9/1997 | Smith et al. | |
| 5,671,536 A | 9/1997 | Everts et al. | |
| 5,675,897 A | 10/1997 | Berfield | |
| 5,743,019 A | 4/1998 | Berfield | |
| 5,765,287 A * | 6/1998 | Griffini | A01D 34/4163 242/125.1 |
| 5,806,192 A | 9/1998 | Everts et al. | |
| 5,881,464 A | 3/1999 | Collins et al. | |
| 5,894,630 A | 4/1999 | Bitner et al. | |
| 6,148,523 A | 11/2000 | Everts et al. | |
| 6,263,580 B1 | 7/2001 | Stark et al. | |
| 6,385,853 B1 | 5/2002 | Berheld | |
| 6,418,627 B1 | 7/2002 | Tsunoda et al. | |
| 6,457,242 B1 | 10/2002 | Fogle | |
| 6,481,107 B2 | 11/2002 | Berfield | |
| 6,581,292 B2 | 6/2003 | Alliss | |
| 6,854,185 B1 | 2/2005 | Alliss | |
| 6,901,667 B2 | 6/2005 | Proulx | |
| 6,944,956 B1 | 9/2005 | Fogle | |
| 6,952,877 B2 | 10/2005 | Pfaltzgraff | |
| 7,100,287 B2 | 9/2006 | McCoid | |
| 7,275,324 B2 | 10/2007 | Proulx | |
| 7,395,601 B2 | 7/2008 | Berfield | |
| 7,412,768 B2 | 8/2008 | Alliss | |
| 7,513,046 B2 | 4/2009 | Proulx | |
| D597,804 S | 8/2009 | Alliss | |
| D598,254 S | 8/2009 | Alliss | |
| D598,255 S | 8/2009 | Alliss | |
| 7,581,322 B2 | 9/2009 | Proulx | |
| 7,607,232 B2 | 10/2009 | Pfaltzgraff | |
| 7,640,668 B2 | 1/2010 | Iacona | |
| 7,739,800 B2 | 6/2010 | Hurley et al. | |
| 7,762,002 B2 | 7/2010 | Proulx | |
| 7,797,839 B2 | 9/2010 | Proulx | |
| 7,882,642 B2 | 2/2011 | Proulx | |
| 7,979,991 B2 | 7/2011 | Pfaltzgraff | |
| 8,001,694 B2 | 8/2011 | Sing et al. | |
| 8,025,249 B2 | 9/2011 | Alliss et al. | |
| 8,266,805 B1 | 9/2012 | Alliss | |
| 8,307,558 B2 | 11/2012 | Alliss | |
| 8,429,886 B2 | 4/2013 | Kato et al. | |
| 8,464,431 B2 * | 6/2013 | Reynolds | A01D 34/4163 30/276 |
| 8,510,960 B2 | 8/2013 | Pfaltzgraff et al. | |
| 8,549,827 B2 | 10/2013 | Kato et al. | |
| 8,707,567 B2 * | 4/2014 | Proulx | A01D 34/4165 30/276 |
| 8,745,879 B2 | 6/2014 | Alliss | |
| 8,863,395 B2 | 10/2014 | Alliss | |
| 8,910,387 B2 | 12/2014 | Alliss | |
| 9,078,394 B2 | 7/2015 | Harless et al. | |
| 9,253,942 B2 | 2/2016 | Alliss et al. | |
| 9,380,743 B2 | 7/2016 | Alliss | |
| 9,516,807 B2 | 12/2016 | Alliss | |
| 2003/0188437 A1 | 10/2003 | Alliss | |
| 2004/0237315 A1 | 12/2004 | Alliss | |
| 2005/0076514 A1 | 4/2005 | McCoid | |
| 2006/0254060 A1 | 11/2006 | Alliss | |
| 2006/0254061 A1 | 11/2006 | Alliss | |
| 2008/0127621 A1 | 6/2008 | Bovo et al. | |
| 2008/0271424 A1 | 11/2008 | Alliss | |
| 2009/0172955 A1 * | 7/2009 | Morris | A01D 34/4163 30/276 |
| 2009/0260237 A1 | 10/2009 | Alliss | |
| 2010/0154229 A1 * | 6/2010 | Iacona | A01D 34/4163 30/347 |
| 2011/0119932 A1 * | 5/2011 | Pfaltzgraff | A01D 34/4165 30/347 |
| 2011/0302793 A1 | 12/2011 | Alliss | |
| 2012/0066913 A1 | 3/2012 | Alliss et al. | |
| 2012/0246945 A1 | 10/2012 | Harless et al. | |
| 2015/0075009 A1 | 3/2015 | Alliss | |
| 2015/0121707 A1 * | 5/2015 | Li | A01D 34/4161 30/276 |
| 2015/0150191 A1 * | 6/2015 | Alliss | A01D 34/4161 29/433 |
| 2015/0327436 A1 | 11/2015 | Skinner et al. | |
| 2016/0081268 A1 * | 3/2016 | Lang | A01D 34/4166 30/276 |
| 2017/0079204 A1 * | 3/2017 | Yamaoka | A01D 34/4165 |
| 2017/0238461 A1 * | 8/2017 | Cabrera | A01D 34/4163 |

FOREIGN PATENT DOCUMENTS

| | | |
|---|---|---|
| EP | 1188361 A1 | 3/2002 |
| WO | 1996039800 A1 | 12/1996 |
| WO | 1997044998 A1 | 12/1997 |
| WO | 2013138752 A1 | 9/2013 |
| WO | 2015077393 A1 | 5/2015 |

* cited by examiner

STRING TRIMMER HEAD AND SPOOL

RELATED APPLICATION

The present application claims priority to U.S. Provisional Patent Application No. 62/557,636, filed Sep. 12, 2017, the entire contents of which are hereby incorporated by reference.

FIELD

The present invention relates to trimmers and, more particularly, to a string trimmer head and a spool.

SUMMARY

Generally, trimmers are used to cut grass and weeds and are often used to edge around trees, near fences and walls, and along landscape borders. Conventional string trimmers include an elongated shaft with a rotating element or head near the end of the elongated shaft, and a spool or string head is attached to the gear head. Typically, the string head includes a monofilament line (i.e., trimmer line) rotated by the head for cutting and trimming along landscaped areas, fences, walls, etc.

In one independent aspect, a spool for a string trimmer may be provided. The spool may be rotatable about a rotational axis and may generally include a central portion extending along the rotational axis; a first flange proximate one end of the central portion, the first flange being in a first plane; a second flange proximate an opposite end of the central portion, the second flange being in a second plane; and an intermediate flange between the first flange and the second flange, the intermediate flange being in a third plane, the third plane being oriented at a non-parallel angle with respect to at least one of the first plane and the second plane, the intermediate flange defining a tube extending transverse to the rotational axis and through the central portion, the tube being configured to receive a line, the tube extending along a tube axis in a fourth plane, the fourth plane being parallel to the at least one of the first plane and the second plane.

In another independent aspect, a trimmer head may generally include a housing defining a cavity and an opening, the housing being rotatable about an axis; and an eyelet supportable in the opening, the eyelet including a body defining a passage communicating between the cavity and an exterior of the trimmer head, the passage having an interior portion with a first (e.g., oval) shape and an exterior portion with a different second (e.g., circular) shape, the first shape having a length generally parallel to the axis greater than a width transverse to the axis, line being supported in the cavity to extend through the passage to the exterior.

In yet another independent embodiment, a trimmer head may generally include a housing assembly defining a cavity and rotatable about an axis, the housing assembly defining a first conical surface; and a spool supported in the cavity and operable to support line to be dispensed, the spool being movable along the axis relative to the housing, the spool defining a second conical surface cooperating with the first conical surface to center the spool during movement of the spool toward and in a position relative to the housing assembly.

Other independent aspects of the invention may become apparent by consideration of the detailed description, claims and accompanying drawings.

DETAILED DESCRIPTION

Figure 1:
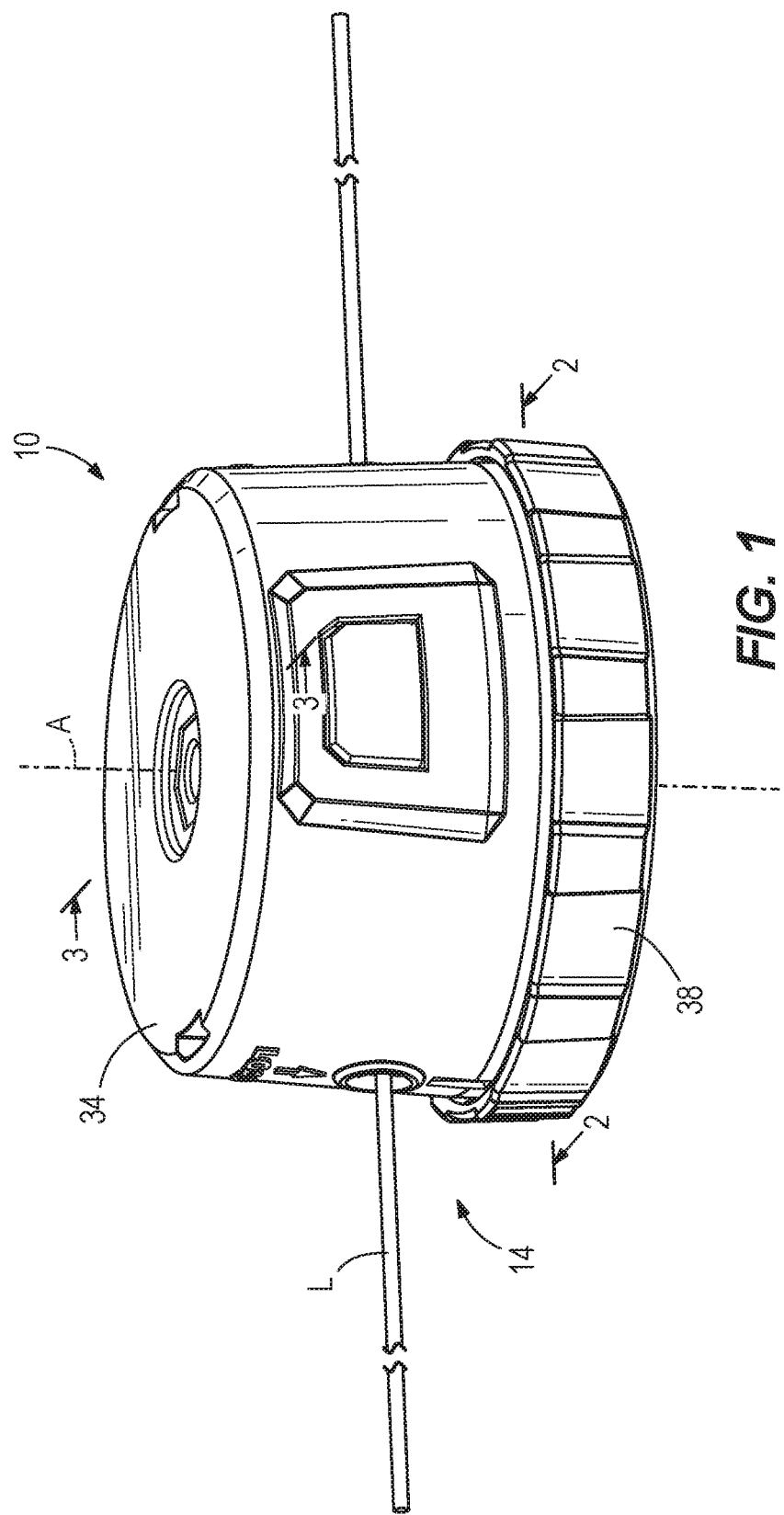
FIG. 1 is a perspective view of a trimmer head.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

FIGS. 1-10 illustrate a string trimmer head 10 for use on an exemplary string trimmer (not shown). Such a trimmer generally includes a shaft with a handle toward one end and a motor housing enclosing an electric motor with a motor-driven output or drive shaft for connection to a trimmer head on the other end. Various powered trimmers (e.g., battery-powered, gas-powered, etc.) may be used with the trimmer head 10. Exemplary trimmers are described and illustrated in U.S. Pat. No. 8,464,431, issued on Jun. 18, 2013, and in U.S. Pat. No. 6,108,914, issued Aug. 29, 2000, the entire contents of both of which are hereby incorporated by reference.

As shown in FIGS. 1-4, the illustrated trimmer head 10 includes a body 14 rotatable about an axis A and supporting a spool 18 for retaining one or more lines L. Line L is wound around the spool 18 and extends through opposed eyelets 30 to cut vegetation (e.g., grass, weeds, etc.).

The body 14 includes (see FIG. 2) an upper portion 34 drivingly connectable to the trimmer drive shaft (not shown) and a lower portion (e.g., a bump knob 38) connected to the spool 18. The portions 34, 38 cooperate to define a cavity 42 for the spool 18. A retainer 46 snap-fits with the upper portion 34 to capture the spool 18 therebetween.

In the illustrated arrangement, the upper portion 34 and the retainer 46 are fixed to the drive shaft (rotatably and axially). The spool 18 and the bump knob 38 are fixed to each other (rotatably and axially) and are movable relative to the upper portion 34 and the retainer 46.

The upper portion 34 includes a side wall 50 defining a pair of eyelet pockets 52, each with an opening 54, for receiving the eyelets 30 and a pair of retainer openings 58. The upper portion 34 also includes a base wall 62 with a center boss 66 defining an annular pocket 68 and teeth 70. The center boss 66 has a connecting member 72 for connection to the trimmer drive shaft.

The retainer 46 includes (see FIGS. 3 and 4) a ring 74 with teeth 78 and defining a central opening 82 with an adjacent cone surface 86. Flexible retainer arms 90 extend from the ring 74, each having a retainer member 94 engageable in an associated retainer opening 58 to connect the upper portion 34 and the retainer 46.

The bump knob 38 includes a center boss 98 with one or more connecting projections 102. An outer rim 104 covers an end of the wall 50 of the upper portion 34 to enclose the cavity 42.

Figure 2:
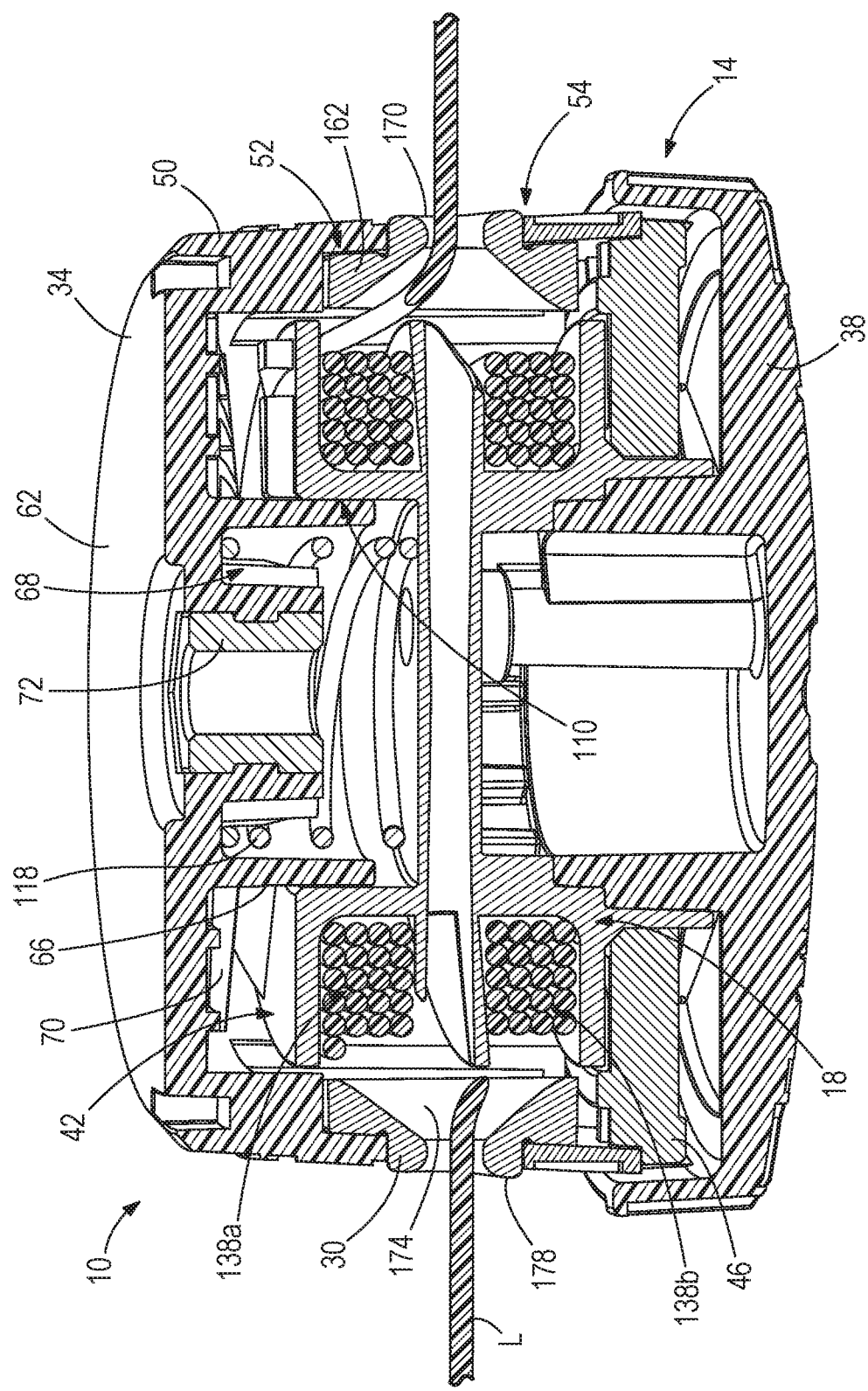
FIG. 2 is a cross-sectional side view of the trimmer head of FIG. 1.
Figure 3:
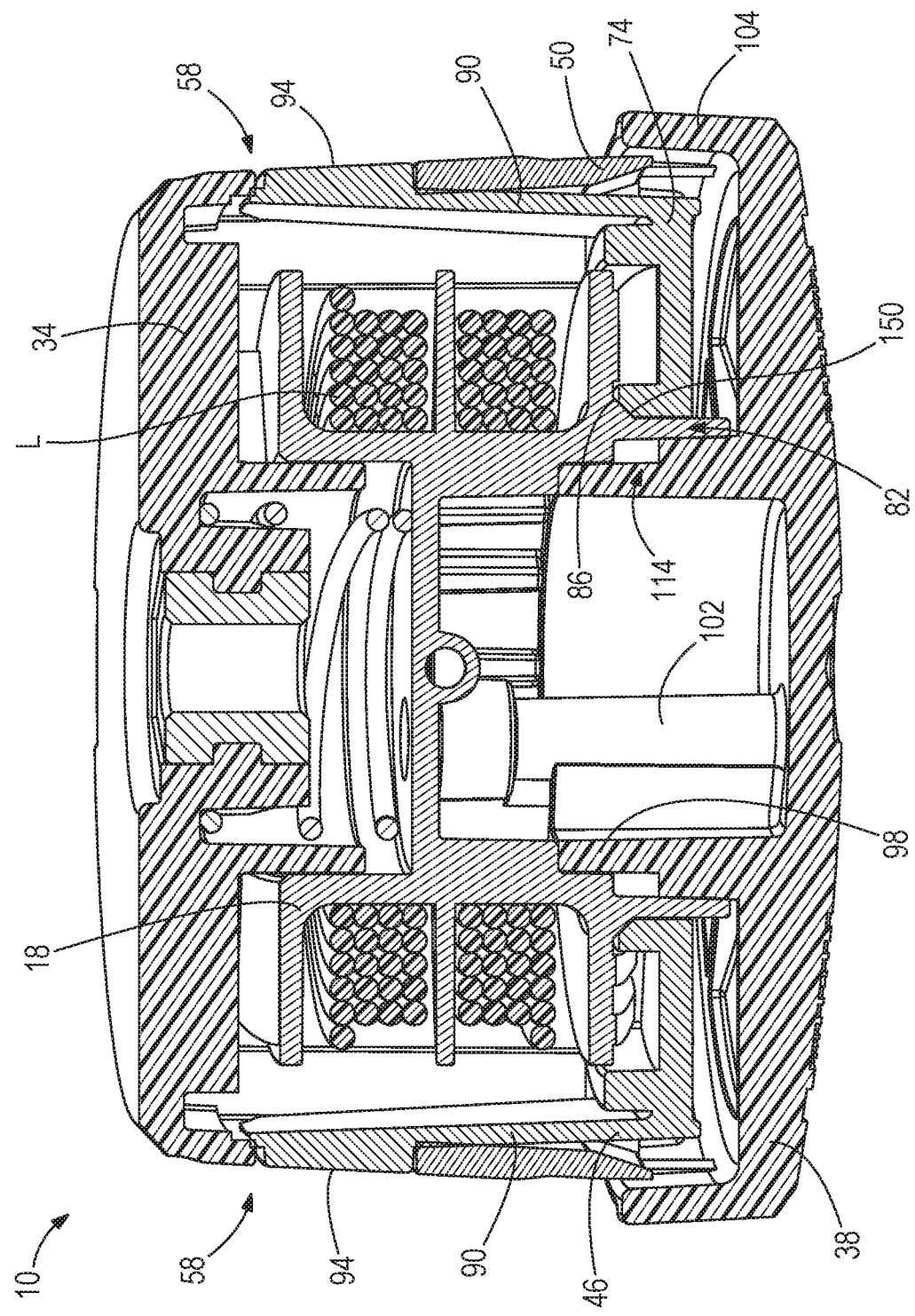
FIG. 3 is another cross-sectional side view of the trimmer head of FIG. 1.
Figure 4:
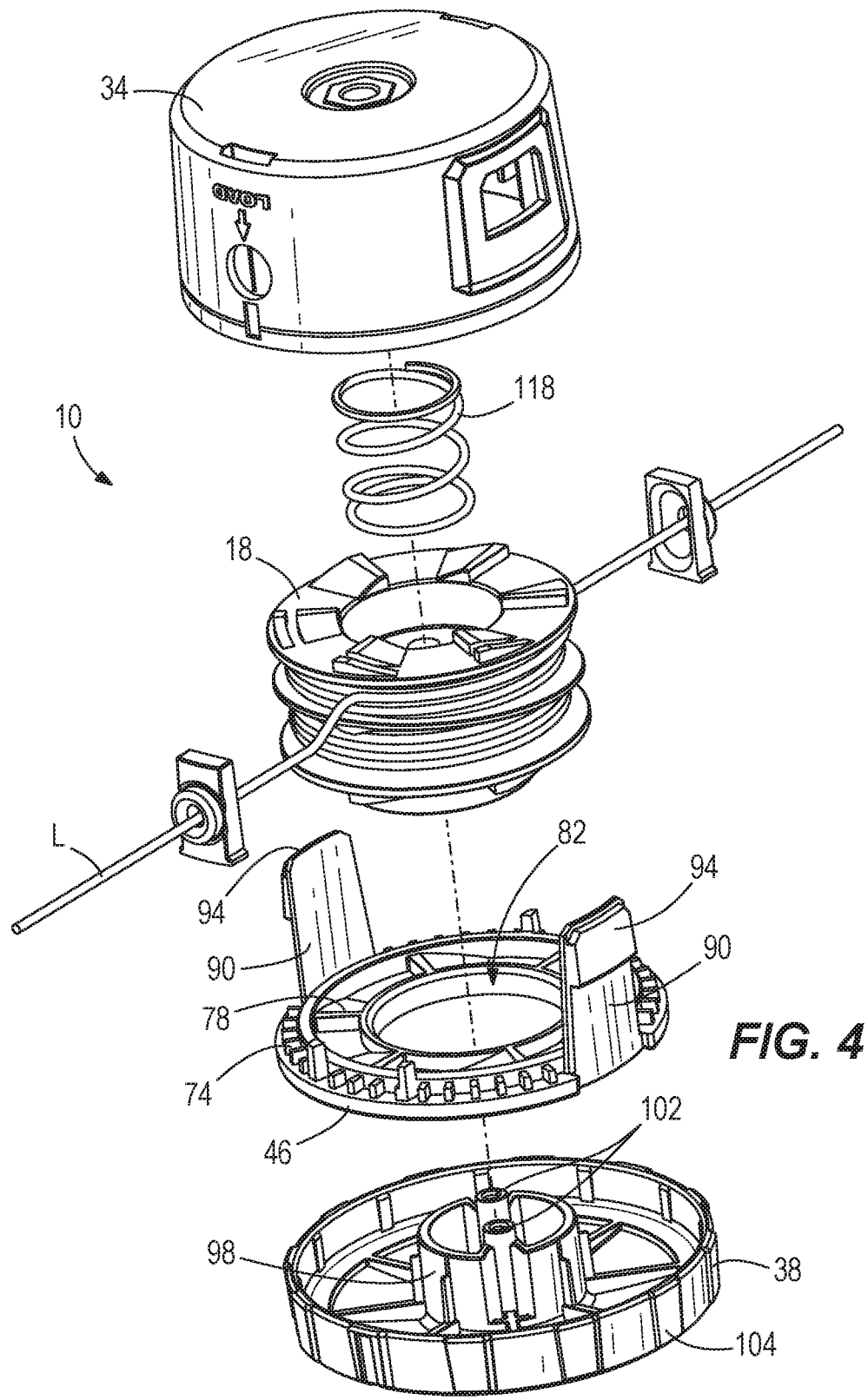
FIG. 4 is an exploded top perspective view of the trimmer head of FIG. 1.
Figure 5:
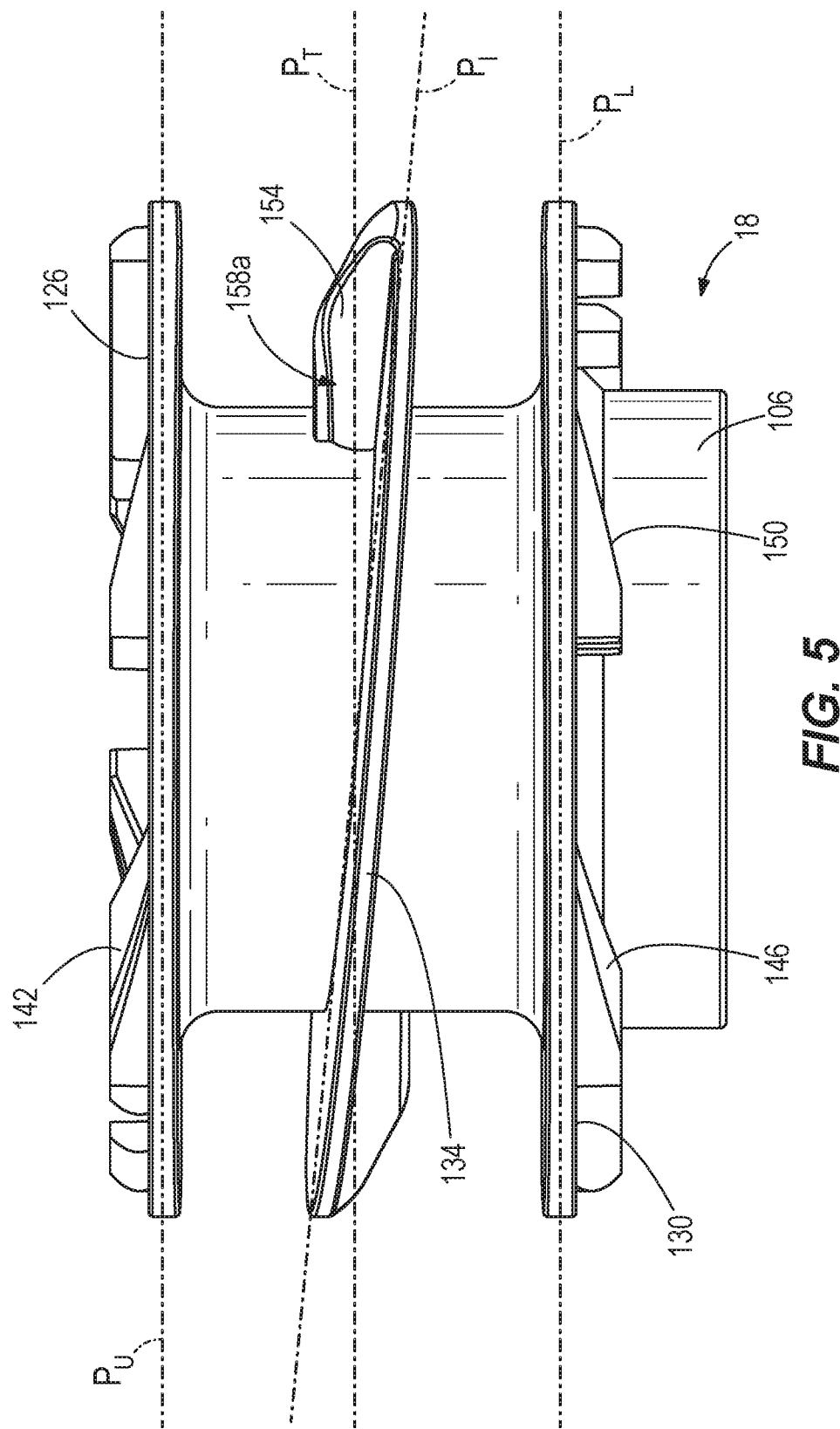
FIG. 5 is a side view of a spool.
Figure 6:
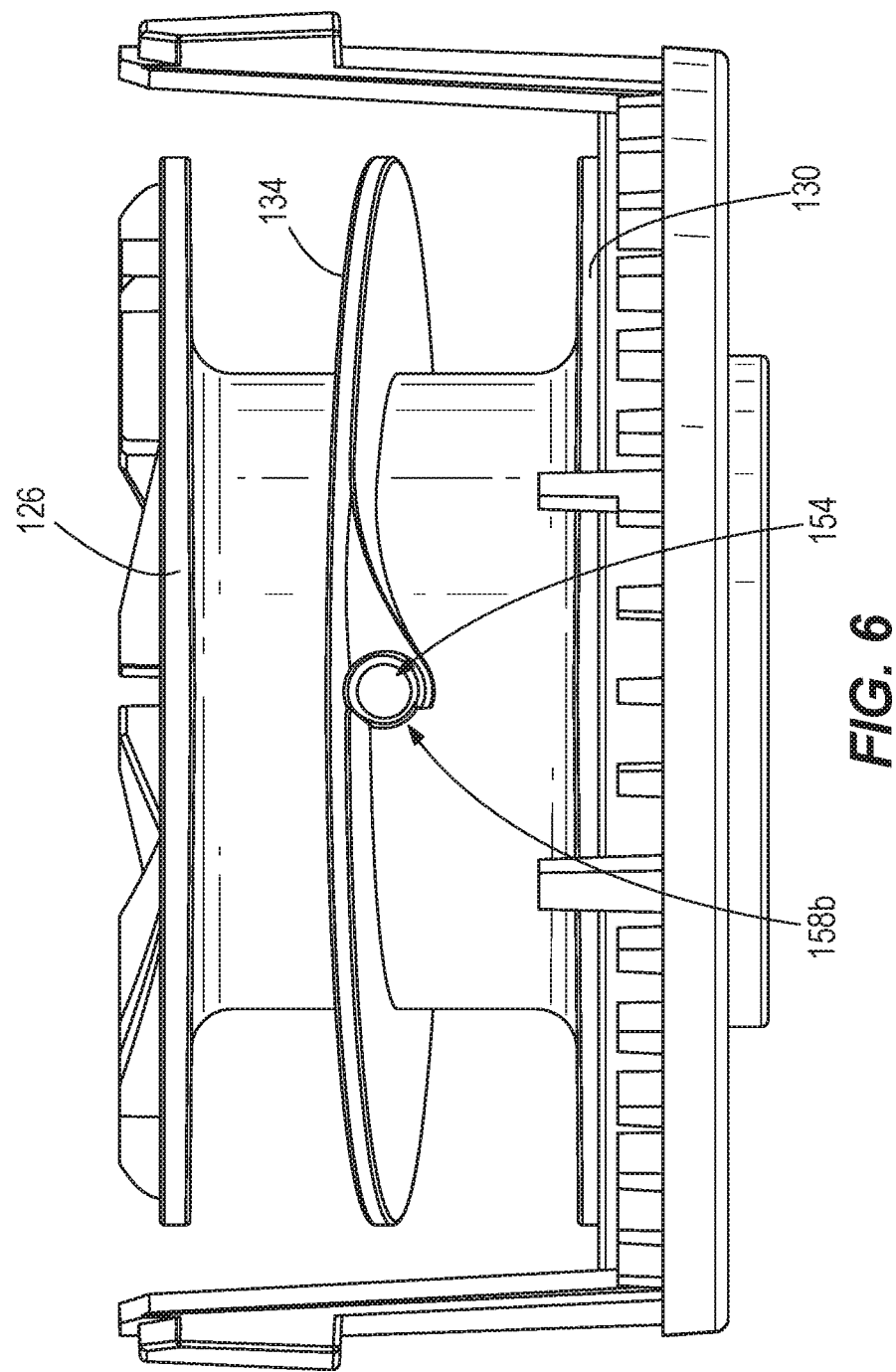
FIG. 6 is another side view of the spool shown in FIG. 5 with a retainer.
Figure 8:
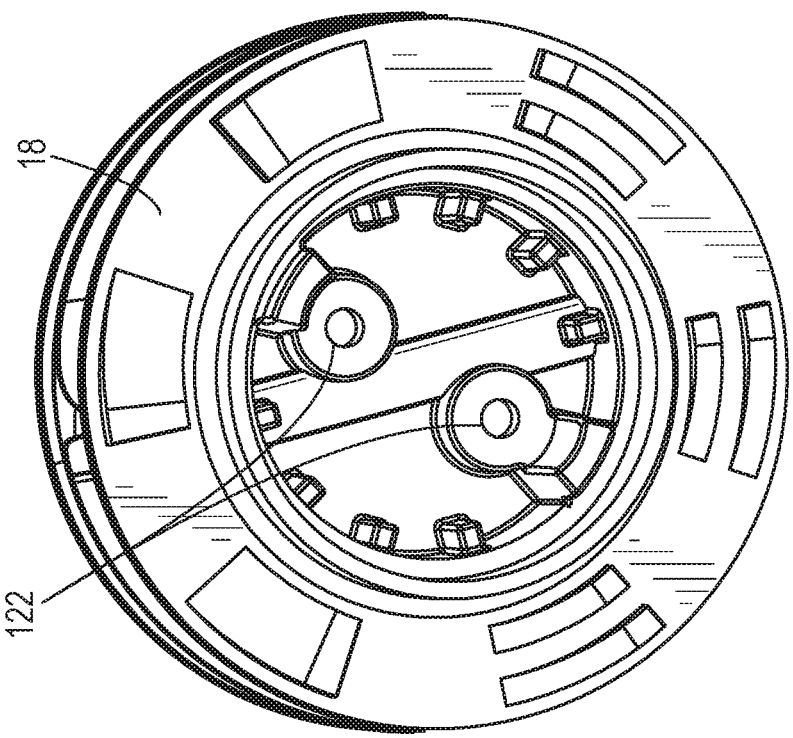
FIG. 8 is a perspective view of the spool shown in FIG. 5.
Figure 9:
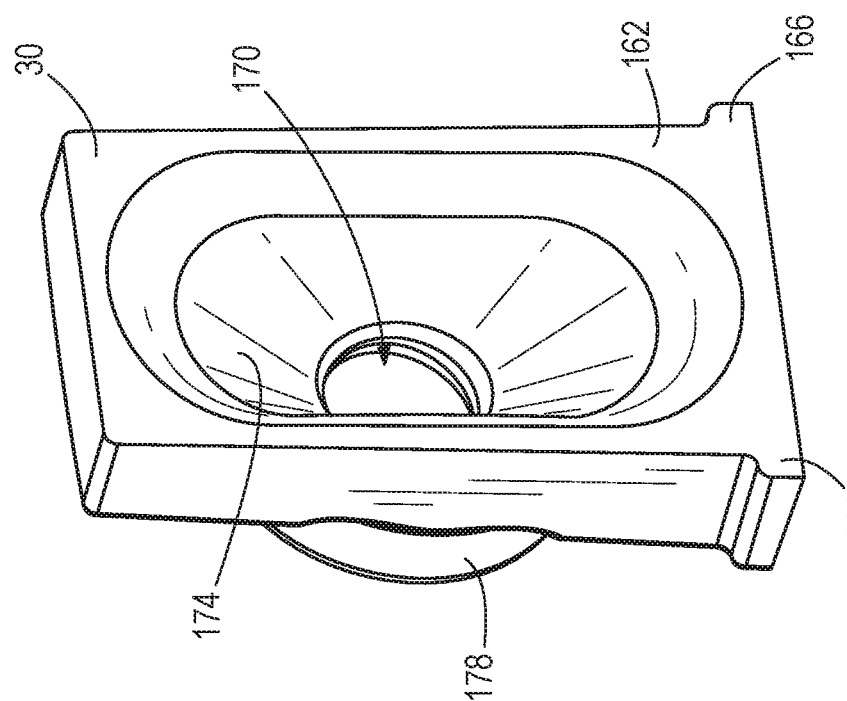
FIG. 9 is a perspective view of the eyelets of FIG. 2.

The spool 18 includes (see FIGS. 5-8) a central body 106 with upper and lower recesses 110, 114. As shown in FIG. 2, the upper recess 110 slidingly receives the center boss 66 and a biasing spring 118 (with one end received in the pocket 68) operable to bias the spool 18 downwardly away from the upper portion 34 to an initial position. As shown in FIG. 9, one or more receptacle members 122 are provided in the lower recess 114, each receiving a connecting projection 102 to connect the spool 18 and the bump knob 38.

Figure 7:
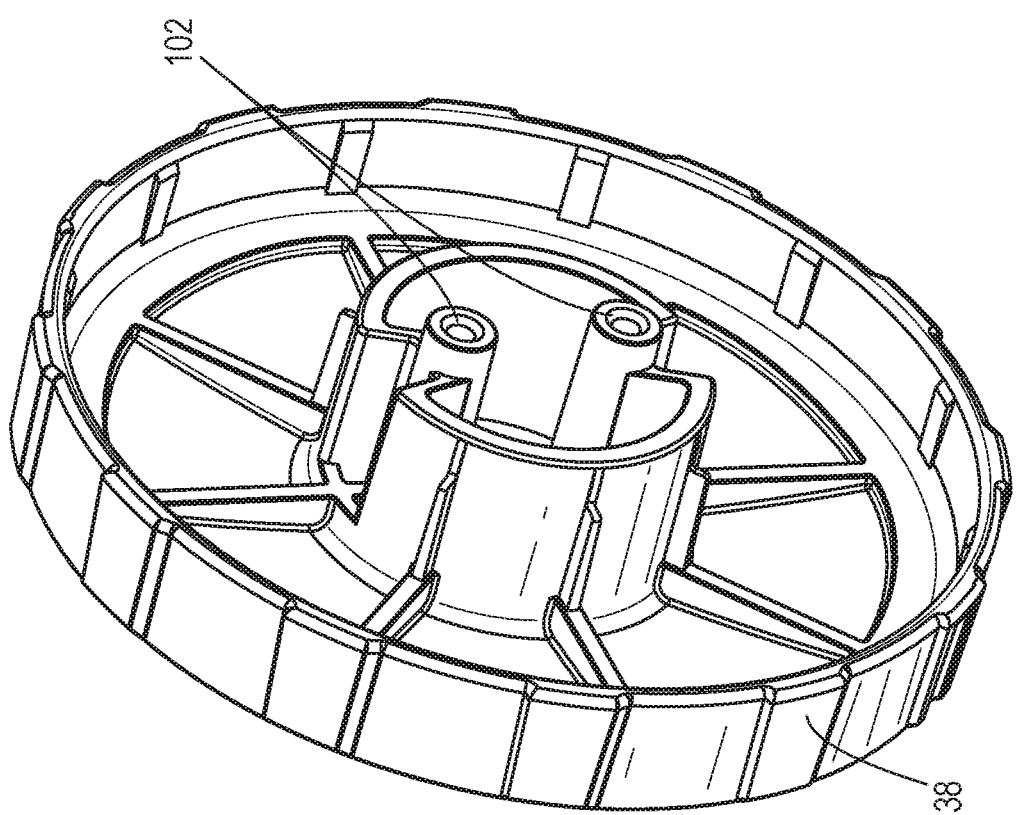
FIG. 7 is a perspective view of a cap shown in FIG. 5.

The spool 18 also includes (see FIG. 5) an upper flange 126 extending around the upper recess 110, a lower flange 130 spaced from the lower recess 114, and an intermediate flange 134 (see FIG. 2) dividing the cavity 42 into upper and lower line receptacles 138a, 138b. As shown in FIG. 7, the upper and lower flanges 126, 130 are arranged in parallel planes $P_U$, $P_L$. The intermediate flange 134 is in a plane $P_I$ arranged at an angle (e.g., slanted) with respect to the planes $P_U$, $P_L$ (between about 1 degree and about 10 degrees (e.g., about 5 degrees)).

Teeth 142 are formed on the upper flange 126 and are selectively engageable with the teeth 70 on the upper portion 34. Teeth 146 are formed on the lower flange 130 and are selectively engageable with the teeth 78 on the retainer 46. In the biased, initial position of the spool 18, the teeth 146, 78 engage to drivingly connect the spool 18 (and the bump knob 38) with the retainer 46 (and with the upper portion 34 and the trimmer drive shaft). A cone surface 150 is located proximate the junction between the lower flange 130 and the body 106. The cone surface 150 cooperates with the cone surface 86 on the retainer 46 to self-center the spool 18 in and during movement to its initial biased position (shown in FIGS. 2-3). This arrangement may reduce vibration of the components during operation.

The intermediate flange 134 defines a tube 154 for receiving the line L. The axis of the tube 154 is in a plane $P_T$ substantially parallel to the planes $P_U$, $P_L$ of the flanges 126, 130 and to the trimmer head 10. In other embodiments (not shown), the plane $P_T$ may be nearly parallel or non-parallel to the planes $P_U$, $P_L$ of the flanges 126, 130 and to the trimmer head 10. The plane $P_I$ of the intermediate flange 134 is also angled (e.g., slanted) with respect to the plane $P_T$. The tube 154 has oppositely-opening radial ends 158a, 158b opening into the upper and lower line receptacles 138a, 138b, respectively. The plane $P_I$ of the flange 134 separates the line L exiting the trimmer head 10 on each side (e.g., by about 5 degrees).

Because it is slanted, the intermediate flange 134 creates a moment about the center of rotation of the trimmer head 10. Removal of material (and mass) at the ends 158a, 158b and on opposite axial sides of the flange 134, reduces or removes the imbalance.

Figure 10:
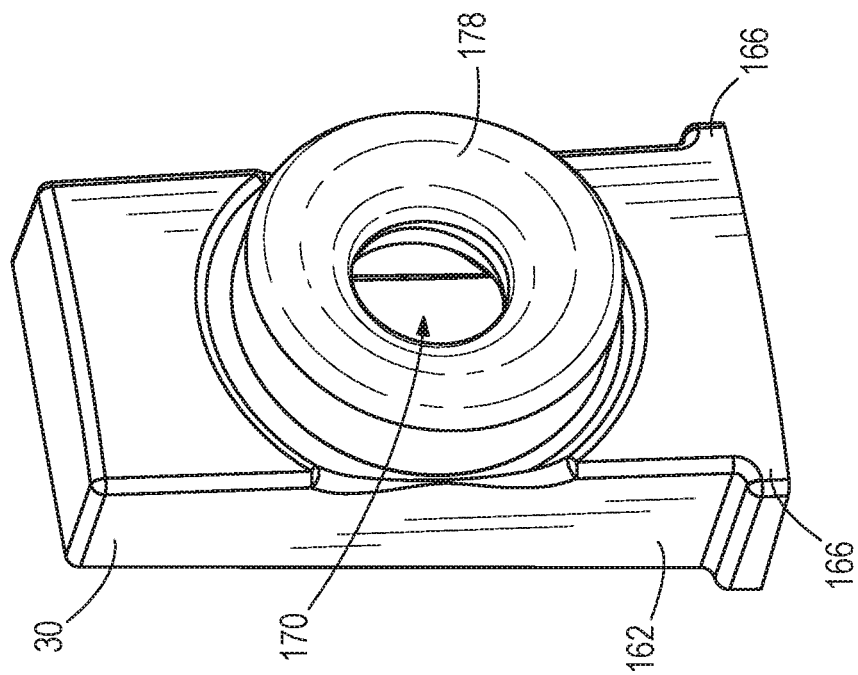
FIG. 10 is another perspective view of the eyelets of FIG. 2.

As shown in FIGS. 2, 9 and 10, each eyelet 30 includes a body 162 received in a pocket 52 with ears 166 limiting movement into the pocket 62. A passage 170 is defined through each eyelet 30. An inner portion 174 of the passage 170 has a first shape (e.g., an oval shape, as illustrated) with a length generally along the axis A greater than its width. The passage 170 transitions to an outer portion having a second shape (e.g., a circular shape) provided in a projection 178 (e.g., a cylindrical projection) received in the opening 54. In other embodiments (not shown), the inner portion 174 of the passage 170 has an alternative shape with similar dimensions (e.g., a length generally along the axis A greater than its width, such as, for example, a rectangular shape). Similarly, the outer portion provided in the projection 178 may have an alternative shape, such that at least its length generally along the axis A (and, potentially, its width) is less than a length (and, potentially, a width) of the passage 170.

With the changing height of the slanted flange 134, the oval-shaped portion 174 ensures line L will not "jump" the flange 134 during loading. The circular-shaped exit portion ensures line L will exit from both sides of the trimmer head 10 in line with each other in a plane perpendicular to the axis A, resulting in a balanced head 10 and even cutting ability.

To assemble, the body 106 of the spool 18 is received in the opening 82 of the retainer 46. The bump knob 38 is connected to the spool 18 by the inter-engaging receptacle member(s) 122 and connecting projection(s) 102. The retainer 46 is captured between the bump knob 38 and the spool 18. The eyelets 30 are received in the eyelet pockets 52, with the each outer projection 178 extending through an opening 54. The retainer 46 is then snap-fit to the upper portion 34, with the retainer arms 90 biasing each retainer member 94 into a retainer opening 58. The spool 18 is thus captured between the upper portion 34 and the retainer 46, and the trimmer head 10 is assembled as a unit.

To install line, the end of a single line L is fed through the passage 170 in one eyelet 30, into and through the tube 154. The end of the line L is then fed through the passage 170 in the other eyelet 30. The line L is centered and then wound onto the spool 18 (e.g., by turning the bump knob 38 is a direction opposite to a feed direction) until sufficient line L extends from each eyelet 30.

In operation, the trimmer is operated to rotate the drive shaft and, thereby, the upper portion 34 (along with the connected retainer 46). As mentioned above, in the biased, initial position of the spool 18, the teeth 146, 78 engage to drivingly connect the spool 18 (and the bump knob 38) with the retainer 46 (and with the upper portion 34 and the trimmer drive shaft). The spool 18 and the line L are rotated so that the line L cuts vegetation.

To dispense additional line L, the bump knob 38 is "bumped" against a surface (not shown; e.g., the ground). The bump knob 38 and the spool 18 move against the spring bias to disengage the teeth 146, 78. With the teeth 146, 78 disengaged, the spool 18 is rotatable relative to the retainer 46 (and relative to the upper portion 34 and the trimmer drive shaft) so that line L is dispensed. As the spool 18 moves axially relative to the upper portion 34 and to the eyelets 30, line L is guided by the oval portion 174 of the eyelet 30.

The bump knob 38 may be depressed until the upper flange 126 engages the base wall 66. The spool 18 rotates and dispenses line L until the teeth 142 on the upper flange 126 engage the teeth 70 on the upper portion 34.

Once the bump knob 38 disengages the surface, the spring 118 biases the spool 18 downwardly away from the upper portion 34. The teeth 142, 70 disengage, and the spool 18 is rotatable relative to the upper portion 34 (and the retainer 46) to dispense additional line L. Again, as the spool 18 moves axially relative to the upper portion 34 and to the eyelets 30, line L is guided by the oval portion 174 of the eyelet 30. The spring 118 moves the spool 18 until the lower flange 130 engages the ring 74. During this movement, the matching cone surfaces 150, 86 self-center the spool 18 on the retainer 46.

Although aspects of the invention have been described in detail with reference to certain preferred constructions, variations and modifications exist within the scope and spirit of one or more independent aspects of the invention as described.

One or more independent features and/or independent advantages of the invention may be set forth in the following claims:

What is claimed is:

1. A spool for a string trimmer, the spool being rotatable about a rotational axis, the spool comprising:
   a central portion extending along the rotational axis;
   a first flange proximate one end of the central portion, the first flange being in a first plane;
   a second flange proximate an opposite end of the central portion, the second flange being in a second plane; and
   an intermediate flange extending around the central portion between the first flange and the second flange, the intermediate flange being in a third plane, the third plane being oriented at a non-parallel angle with respect to at least one of the first plane and the second plane, the intermediate flange defining a tube extending transverse to the rotational axis and through the central portion, the tube being configured to receive a line, the tube extending along a tube axis in a fourth plane, the fourth plane being parallel to the at least one of the first plane and the second plane.

2. The spool of claim 1, wherein the first plane is parallel to the second plane.

3. The spool of claim 1, wherein the third plane is oriented at a non-parallel angle with respect to the first plane and the second plane.

4. The spool of claim 1, wherein the fourth plane is parallel to the first plane and the second plane.

5. The spool of claim 1, wherein a first line receptacle is defined between the first flange and the intermediate flange and a second line receptacle is defined between the second flange and the intermediate flange, and wherein the tube defines a first end opening into the first line receptacle and an opposite second end opening into the second line receptacle.

6. The spool of claim 1, wherein the central portion defines a recess operable to receive a boss and a biasing member, the biasing member being configured to bias the spool.

7. The spool of claim 1, wherein the first flange further includes a plurality of teeth selectively engageable with the string trimmer.

8. The spool of claim 1, wherein the second flange further includes a conical surface selectively engageable with the string trimmer to center the spool.

* * * * *